US010163312B2

(12) United States Patent
Jenkins (10) Patent No.: US 10,163,312 B2
(45) Date of Patent: Dec. 25, 2018

(54) AUTONOMOUSLY OPERATING LIGHT EMITTING DEVICES PROVIDING DETECTION AND WARNING OF HAZARDOUS CONDITION ON PATH OF TRAVEL (71) Applicant: Western Digital Technologies, Inc., Irvine, CA (US)

(72) Inventor: Dean Mitcham Jenkins, La Canada-Flintridge, CA (US)

(73) Assignee: Western Digital Technologies, Inc., San Jose, CA (US)

(*) Notice: Subject to any disclaimer, the term of this patent is extended or adjusted under 35 U.S.C. 154(b) by 154 days.

(21) Appl. No.: 15/282,977

(22) Filed: Sep. 30, 2016

(65) Prior Publication Data

US 2018/0096572 A1   Apr. 5, 2018

(51) Int. Cl.
| | | |
|---|---|---|
| H04N 9/47 | (2006.01) | |
| H04N 7/18 | (2006.01) | |
| G08B 7/06 | (2006.01) | |
| F21V 23/04 | (2006.01) | |
| H05B 33/08 | (2006.01) | |
| H05B 37/02 | (2006.01) | |
| F21K 9/232 | (2016.01) | |
| F21Y 115/10 | (2016.01) | |
| F21K 9/235 | (2016.01) | |

(Continued)

(52) U.S. Cl.
CPC .............. *G08B 7/066* (2013.01); *F21V 23/04* (2013.01); *H04N 7/181* (2013.01); *H05B 33/0854* (2013.01); *H05B 33/0872* (2013.01); *H05B 37/0227* (2013.01); *H05B 37/0272* (2013.01); *F21K 9/232* (2016.08); *F21K 9/235* (2016.08); *F21V 3/00* (2013.01); *F21V 15/01* (2013.01); *F21Y 2115/10* (2016.08); *G08B 7/062* (2013.01)

(58) Field of Classification Search
None
See application file for complete search history.

(56) References Cited

U.S. PATENT DOCUMENTS

| | | |
|---|---|---|
| 4,801,928 A | 1/1989 | Minter |
| 8,269,642 B2 | 9/2012 | Morita et al. |
| 9,265,115 B1 | 2/2016 | Dunn et al. |

(Continued)

OTHER PUBLICATIONS

International Search Report and Written Opinion dated Oct. 2, 2017, from related International Application PCT/US2017/039328, 14 pgs.

(Continued)

*Primary Examiner* — Talha M Nawaz
(74) *Attorney, Agent, or Firm* — Barry IP Law, P.C.

(57) ABSTRACT

A system is disclosed comprising a plurality of light emitting devices located along a path of travel, each light emitting device comprising a light emitting source, a sensor, a communication module, and a processor, wherein when a first one of the plurality of light emitting devices is activated, the processor in the first light emitting device is configured to detect one or more physical structures surrounding the first light emitting device, detect one or more other light emitting devices, and based at least in part on the detection of the one or more physical structures and the one or more other light emitting devices, determine a location of the first light emitting device with respect to the path of travel.

29 Claims, 6 Drawing Sheets (51) Int. Cl.
*F21V 3/00* (2015.01)
*F21V 15/01* (2006.01)

(56) References Cited

U.S. PATENT DOCUMENTS

| | | |
|---|---|---|
| 9,408,282 B1* | 8/2016 | Springer ............ H05B 37/0272 |
| 2008/0291037 A1 | 11/2008 | Lax |
| 2010/0073172 A1 | 3/2010 | Lax |
| 2014/0203939 A1 | 7/2014 | Harrington et al. |
| 2014/0340222 A1* | 11/2014 | Thornton ................ G08B 7/062 |
| | | 340/539.17 |
| 2015/0038165 A1 | 2/2015 | Tuo et al. |
| 2016/0057819 A1 | 2/2016 | Wang et al. |
| 2016/0109232 A1* | 4/2016 | Shin ..................... H04N 5/2256 |
| | | 348/140 |
| 2017/0143423 A1* | 5/2017 | Lai ....................... A61B 18/203 |
| 2018/0096572 A1* | 4/2018 | Jenkins .............. H05B 37/0227 |

OTHER PUBLICATIONS

Eazzydv Electric Ltd., BC-883 Wireless Bulb IP Network Camera with SD Card, Real Light Control by Remote Control, available at: http://www.eazzydv.com/c888.html, accessed Jan. 31, 2017, 3 pgs.

* cited by examiner

AUTONOMOUSLY OPERATING LIGHT EMITTING DEVICES PROVIDING DETECTION AND WARNING OF HAZARDOUS CONDITION ON PATH OF TRAVEL

BACKGROUND

Various systems (e.g., fire alarm systems and lighting systems) are typically employed to warn people of hazardous conditions that may occur in office buildings, hotels, apartment buildings, or other buildings. For example, fire alarm systems are employed in buildings to warn people of potential harm from a fire that may occur in these buildings. For example, lighting systems are generally employed in commercial and private buildings to illuminate paths of travel (e.g., hallways or corridors) in these buildings, thereby enabling people who move along these paths of travel to see hazardous conditions (e.g., broken glass or spilled liquid) that may be harmful if inadvertently encountered due to insufficient illumination along the path of travel.

BRIEF DESCRIPTION OF THE DRAWINGS

Light emitting devices, systems of light emitting devices, and methods that embody the various features of the invention will now be described with reference to the following drawings, in which:

FIG. 1B is a flow diagram executed by a processor in a first light emitting device located along a path of travel, the processor configured to autonomously detect one or more physical structures surrounding the first light emitting device, detect a second light emitting device, based at least in part on the detection of the one or more physical structures and the second light emitting device, determine a location of the first light emitting device with respect to the path of travel, scan for a hazardous condition along the path of travel, and when the hazardous condition is detected, cause at least a portion of a light emitting source in the first light emitting device to form a warning light pattern emitting light of a first color and, based on the location of the hazardous condition, selectively cause at least a portion of the light emitting source of the second light emitting device to form the warning pattern emitting light of the first color, in accordance with one embodiment of the invention.

DETAILED DESCRIPTION

Various embodiments of the invention are directed to a plurality of light emitting devices located along a path of travel, each light emitting device comprising a light emitting source (e.g., a plurality of LED lights), a sensor (e.g., a camera), a communication module (e.g., a wireless communication module), and a processor, wherein, when a first light emitting device is activated, the processor is configured to detect one or more physical structures surrounding the first light emitting device, detect one or more other light emitting devices, and based at least in part on the detection of the one or more physical structures and the one or more other light emitting devices, determine a location of the first light emitting device with respect to the path of travel. For example, the path of travel may be in a pathway, hallway, or covered/partially-covered space in a home, office building, hotel, apartment building, or other public, non-commercial, commercial or private structure. In one embodiment, the processor is configured to use the communication module of the first light emitting device to detect the one or more other light emitting devices. In one embodiment, the processor is configured to cause the sensor of the first light emitting device and the sensor of the one or more other light emitting devices to scan for a hazardous condition along the path of travel. In one embodiment, each light emitting device is screwed into a standard light socket.

In various embodiments, when the processor of the first light emitting device detects a hazardous condition, the processor is further configured to cause at least a portion of the light emitting source (e.g., array of LED lights) of the first light emitting device to form a first light pattern emitting light of a first color, and based on the location of the detected hazardous condition, selectively cause at least a portion of the light emitting source of the one or more other light emitting devices to form the first light pattern emitting light of the first color. For example, the first light pattern and the first color may be selected to provide a warning of the detected hazardous condition. For example, the first light pattern and the first color may be selected to illuminate a direction, along the path of travel, away from the detected hazardous condition. For example, the first light pattern may comprise a rapid on/off alternation of at least a portion of the light emitting source of the first light emitting device and at least a portion of the light emitting device of the one or more other light emitting devices, and the first color may be red.

In one embodiment, the processor in the first light emitting device is further configured to detect an exit, wherein the first light pattern and the first color are selected to illuminate a direction, along the path of travel, based on the detected exit. In one embodiment, when a hazardous condition has not been detected, the processor in the first light emitting device is further configured to cause at least a portion of the light emitting source of the first light emitting device and at least a portion of the light emitting device of the one or more light emitting devices to form a second pattern emitting light of a second color. The second light pattern and the second color may be selected to illuminate the path of travel, for example. In one embodiment in which the light emitting source in each light emitting device comprises an array of LED lights, the second pattern may comprise all of at least a portion of the LED lights in each light emitting device being turned on at a constant intensity, and the second color may be white.

Various embodiments of the invention will now be described. These embodiments are presented by way of example only, and are not intended to limit the scope of the invention. Various omissions, substitutions and changes in the form of the methods and devices described herein may be made without departing from the spirit of the invention. To illustrate some of the embodiments, reference will now be made to the figures.

Figure 1A:
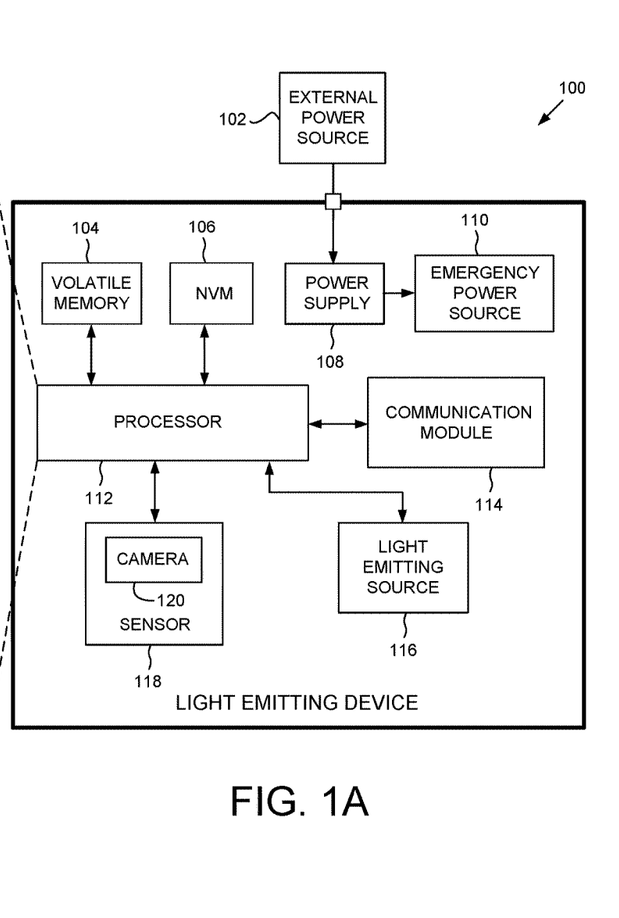
FIG. 1A is a block diagram showing a light emitting device coupled to an external power source and comprising a processor, a communication module, a sensor (e.g., a camera), and a light emitting source (e.g., an array of LED lights), in accordance with one embodiment of the invention.

FIG. 1A shows light emitting device 100 coupled to external power source 102 (e.g., an AC or DC power source) in accordance with one embodiment of the invention. In the embodiment shown in FIG. 1A, light emitting device 100 comprises volatile memory 104, non-volatile memory (NVM) 106, power supply 108, emergency power source 110, processor 112, communication module 114, light emitting source 116, and sensor 118, which may comprise camera 120 and/or any other suitable sensor or combination of sensors (e.g., audio sensor, smoke sensor, temperature sensor, vibration sensor, etc.). In the embodiment shown in FIG. 1A, power supply 108 is coupled to external power source 102 and emergency power source 110. Power supply 108 is configured to receive power (e.g., AC or DC power) from external power source 102 and provide power to emergency power source 110 as well as volatile memory 104, NVM 106, processor 112, communication module 114, light emitting source 116, and sensor 118. In the embodiment in FIG. 1A, power supply 108 may comprise a power converter configured to convert an AC voltage (e.g., 85-240 VAC) to one or more DC voltages. In the embodiment in FIG. 1A, emergency power source 110 may comprise one or more charge storage elements (e.g., capacitors or batteries), which are charged by external power source 102 to a required backup voltage to provide power to light emitting device 100 in case power from external power source 102 is interrupted.

In one embodiment, light emitting device 100 is housed in an enclosure and power supply 108 receives power from external power source 102 when an electrical screw base (e.g., an E26 screw base in US or an E27 screw base in Europe) on light emitting device 100 is electrically connected to a corresponding socket that is coupled to external power source 102. For example, the socket to which the electrical screw base on light emitting device 100 is connected may be installed in a ceiling or on a wall in a hallway, pathway, or covered/partially-covered space in a home, office building, hotel, apartment building, or other public, non-commercial, commercial or private structure. For example, the electrical screw base on light emitting device 100 may be screwed into the socket installed in the ceiling or wall in the pathway, hallway, or covered/partially-covered space to provide electrical connectivity between light emitting device 100 and external power source 102.

As shown in the embodiment in FIG. 1A, processor 112 is coupled to volatile memory 104, NVM 106, communication module 114, light emitting source 116, and sensor 118 (e.g., camera 120). Processor 112 may be, for example, a microprocessor and is configured to control the operation of volatile memory 104, NVM 106, communication module 114, light emitting source 116 and sensor 118 (e.g., camera 120). In one embodiment, a state machine or combinatory logic may be used in place of processor 112 to control the operation of volatile memory 104, NVM 106, communication module 114, light emitting source 116 and sensor 118 (e.g., camera 120). In the embodiment shown in FIG. 1A, processor 112 may be configured to operate in a master mode or a slave mode. In one embodiment, processor 112 may be configured to operate in a master mode or a slave mode by setting a switch in light emitting device 100. In some embodiments, a light emitting device may not include a sensor 118. For example, a series of light emitting devices may include a sensor-equipped device in every Nth device, while the other devices may not be equipped with a sensor.

As shown in FIG. 1A, volatile memory 104 serves as a temporary data storage location and may comprise, for example, dynamic random access memory (DRAM), static random access memory (SDRAM), or other non-persistent type of memory. In the embodiment shown in FIG. 1A, NVM 106 provides a storage location for software that may be executed by processor 112 and may comprise, for example, Magnetoresistive random-access memory (MRAM), Chalcogenide RAM (C-RAM), correlated electron RAM (CeRAM), Phase Change Memory (PC-RAM or PRAM), Programmable Metallization Cell RAM (PMC-RAM or PMCm), Ovonic Unified Memory (OUM), Resistance RAM (ReRAM), NAND or NOR flash memory, EEPROM, Ferroelectric Memory (FeRAM), or other discrete non-volatile memory.

In the embodiment shown in FIG. 1A, communication module 114 enables processor 112 to communicate with other light emitting devices 100 and may be, for example, a wireless communication module. In one embodiment, communication module 114 may comprise circuitry to enable WiFi communication over the Internet or a local network. In one embodiment, communication module 114 may comprise circuitry to enable Bluetooth communication with other Bluetooth-enabled devices (e.g., other Bluetooth-enabled light emitting devices). In an embodiment, communication module 114 may comprise circuitry to enable processor 112 to communicate over a wireless communication standard other than Bluetooth. Other wired methods of communications such as Ethernet over Powerline may be used as well.

As shown in FIG. 1A, light emitting source 116 may comprise, for example, an array of light emitting diode (LED) lights, wherein each LED light is independently controllable to be in an off state, an on state, or a pulsing on and off state and emit light having one of a plurality of colors. For example, light emitting source 116 may be programmed by processor 112 to emit white light to illuminate an underlying path of travel when processor 112 is operating in a normal operating mode, in which processor 112 may operate in when not detecting a hazardous condition in the path of travel. In one embodiment in which light emitting source 116 comprises an array of LED lights, when processor 112 detects a hazardous condition in the path of travel, processor 112 is configured to cause at least a portion of the array of LED lights to form a warning light pattern emitting light having a warning color (e.g., red), wherein the warning light pattern and the warning color are selected to provide a warning of the detected hazardous condition. For example, the warning light pattern may comprise an on and off pulsing pattern of red light.

In the embodiment shown in FIG. 1A, sensor 118 comprises camera 120, which may comprise, for example, a wide-angle lens (e.g., a fisheye lens). In one embodiment, sensor 118 may comprise an infrared (IR) sensor, a thermal sensor, or other type of sensor. In one embodiment, sensor 118 may comprise a plurality of different types of sensors (e.g., a camera and/or an IR sensor and/or a thermal sensor). In the embodiment in FIG. 1, processor 112 may program camera 120 to scan for a hazardous condition in a path of travel underlying light emitting device 100.

Figure 1B:
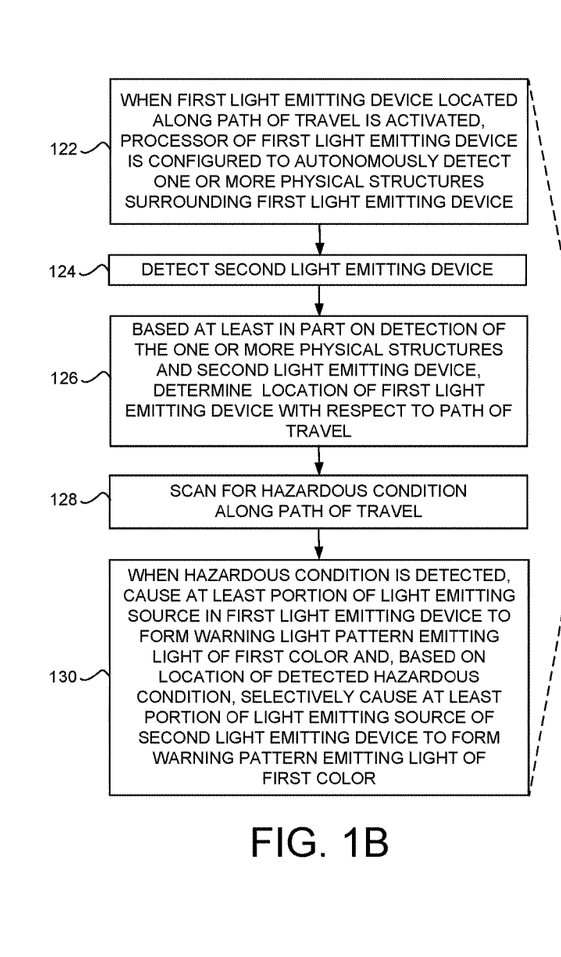

In the embodiment in FIG. 1A, processor 112 is configured to execute the flow diagram of FIG. 1B, wherein, in block 122, when a first light emitting device 100 located along a path of travel is activated, first processor 112 (in the first light emitting device 100) autonomously detects one or more physical structures surrounding the first light emitting device 100. For example, the path of travel may be in a pathway, hallway, or covered/partially-covered space in a home, office building, hotel, apartment building, or other public, non-commercial, commercial or private structure. For example, the one or more physical structures may comprise one or more walls and/or a ceiling or floor in such a building/structure. In block 124, the first processor 112 detects a second light emitting device 100. For example, the first processor 112 may detect the second light emitting device 100 by using camera 120 (or any suitable sensor) or communication module 114 in the first light emitting device 100. For example, the first light emitting device 100 may be activated when it is electrically connected to external power source 102.

In block 126 of the flow diagram of FIG. 1B, based at least in part on detection of the one or more physical structures and the second light emitting device 100, the first processor 112 determines the location of the first light emitting device 100 with respect to the path of travel. In block 128, the first processor 112 scans for a hazardous condition along the path of travel. For example, the hazardous condition may be a fire, broken glass, spilled liquid, or other condition that may cause harm to anyone moving along the path of travel. The first processor 112 may use camera 120 (or any suitable sensor) in the first light emitting device 100 to scan for the hazardous condition, for example. In one embodiment, the first processor may employ camera 120 (or any suitable sensor) in the first light emitting device 100 and camera 120 (or any suitable sensor) in the second light emitting device 100 to scan for the hazardous condition.

In block 130 of the flow diagram of FIG. 1B, when a hazardous condition is detected, the first processor 112 causes at least a portion of light emitting source 116 in the first light emitting device to form a warning light pattern emitting light of a first color (e.g., red) and, based on the location of the detected hazardous condition, selectively cause at least a portion of the light emitting source of the second light emitting device to form a warning pattern emitting light of the first color. In one embodiment, the first and second colors can be the same, while in another embodiment, they can be different.

Figure 2A:
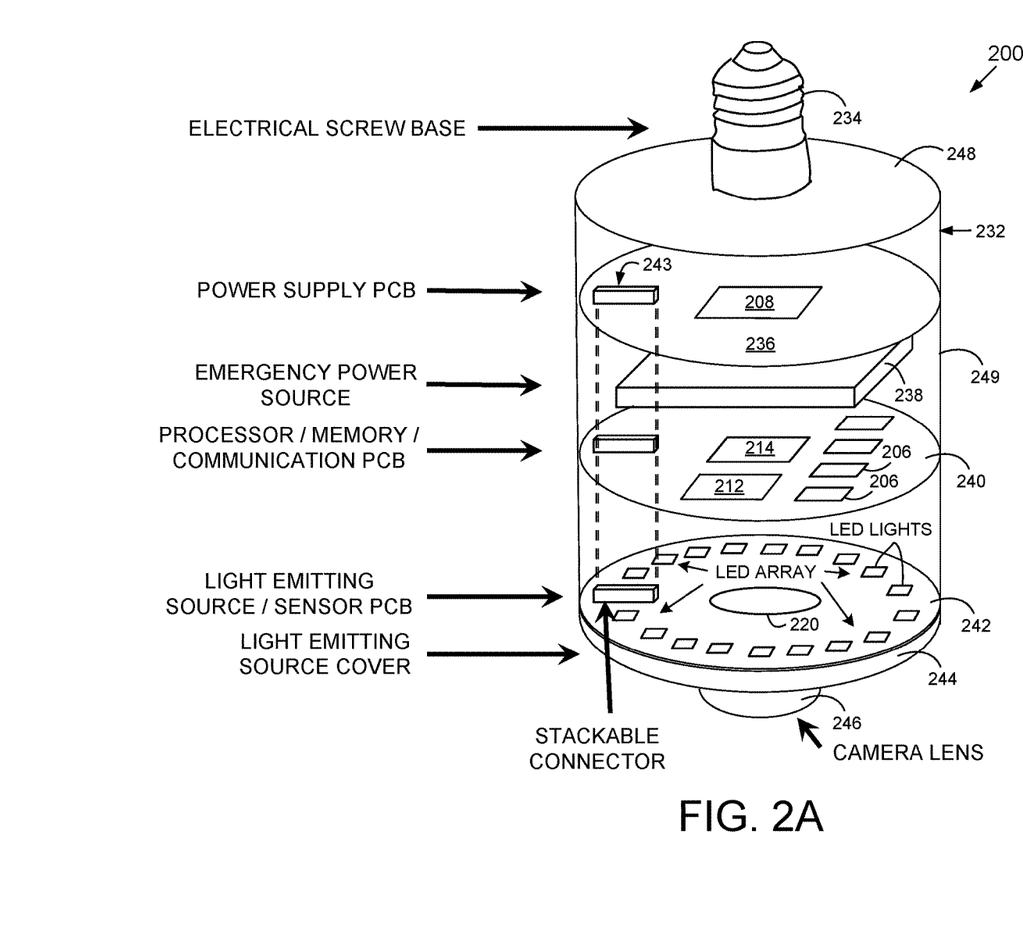
FIG. 2A is an exploded view of a light emitting source comprising an electrical screw base, a power supply PCB, an emergency power source, a processor/memory/communication PCB, a light emitting source/sensor PCB, a light emitting cover, and a camera lens, in accordance with one embodiment of the invention.

FIG. 2A shows an exploded view of light emitting device 200 in accordance with one embodiment of the invention. Light emitting device 200 may be installed, for example, in a ceiling, on a wall, or on a structure in a pathway, hallway, or covered/partially-covered space in a public, non-commercial, commercial or private structure. In the embodiment shown in FIG. 2A, light emitting device 200 comprises enclosure 232, electrical screw base 234, power supply printed circuit board (PCB) 236, emergency power source 238, processor/memory/communication PCB 240, light emitting source/sensor PCB 242, stackable connector 243, light emitting source cover 244, and camera lens 246. As shown in the embodiment in FIG. 2A, enclosure 232 includes end portion 248 and sidewall portion 249 and is configured to enclose power supply printed circuit board (PCB) 236, emergency power source 238, processor/memory/communication PCB 240, and light emitting source/sensor PCB 242. Enclosure 232 may comprise, for example, plastic, metal, or other suitable material. Some embodiments may (1) omit certain components such as camera lens 246 or emergency power source 238, (2) provide substitute components, or (3) contain additional components not shown here.

In the embodiment shown in FIG. 2A, electrical screw base 234 is mounted on end portion 248 of enclosure 232 and comprises a standard screw base (e.g., an E26 screw base in US or an E27 screw base in Europe). In one embodiment, electrical screw base 234 may comprise a non-standard screw base. In the embodiment shown in FIG. 2A, electrical screw base 234 is configured to be screwed into a standard light socket to provide an electrical connection with and receive power from an external power source (not shown in FIG. 2A) that is electrically connected to the standard light socket. For example, the standard light socket may be installed in a ceiling, on a wall, or on a structure in a hallway, corridor, or room in a commercial or private structure. In one embodiment, light emitting device 200 is activated when electrical screw base 234 is screwed into a corresponding standard light socket and the socket is receiving power from the external power source. In one embodiment, light emitting device 200 is activated by setting a switch in light emitting device 200 (not shown in FIG. 2A) to an ON position after electrical screw base 234 has been screwed into a socket that is receiving power from the external power source.

As shown in the embodiment in FIG. 2A, power supply PCB 236 is situated under electrical screw base 234 and end portion 248 of case 232 and includes power supply 208, which is configured to receive power from an external power source via electrical screw base 234 and a corresponding standard light socket electrically coupled to the external power source, and provide power at a required voltage(s) to emergency power source 238, processor/memory/communication PCB 240, and light emitting source/sensor PCB 242. In the embodiment shown in FIG. 2A, emergency power source 238 is situated adjacent to power supply PCB 236, comprises a battery, and is electrically connected to power supply 208, which charges the battery to a predetermined voltage. The battery provides emergency power for powering processor/memory/communication PCB 240 and light emitting source/sensor PCB 242 when power from the external power source is interrupted.

As shown in FIG. 2A, processor/memory/communication PCB 240 is situated adjacent to emergency power source 238 and includes NVM 206, processor 212, and communication module 214. Processor/memory/communication PCB may also include volatile memory (not shown in FIG. 2A), such as volatile memory 104 in FIG. 1A. In the embodiment shown in FIG. 2A, light emitting source/sensor PCB 242 is situated adjacent to processor/memory/communication PCB 240 and includes a sensor (camera 220) and a light emitting source (an array of LED lights situated along a perimeter of light emitting source/sensor PCB 242. The PCBs may be combined into a single PCB or separated into multiple PCBs in other embodiments.

As shown in FIG. 2A, stackable connector 243 is configured to electrically connect together power supply PCB 236, processor/memory/communication PCB 240, and light emitting source/sensor PCB 242. In the embodiment shown in FIG. 2A, light emitting source cover 244 is situated adjacent to light emitting source/sensor PCB 242 and covers and protects the LED array situated on light emitting source/sensor PCB 242. As shown in FIG. 2A, camera lens 246 is mounted on camera 220 and extends through light emitting source cover 244. Camera lens 246 may be, for example, a wide-angle lens (e.g., a fisheye lens). As discussed previously in FIG. 1A, other suitable sensors may be used in place of a camera. Light emitting source cover 244 may comprise, for example, a clear material (e.g., clear glass or plastic) to minimally impede light emitting from the LED lights. In one embodiment, light emitting source cover 244 may comprise a material that diffuses light emitting from the array of LED lights.

Figure 2B:
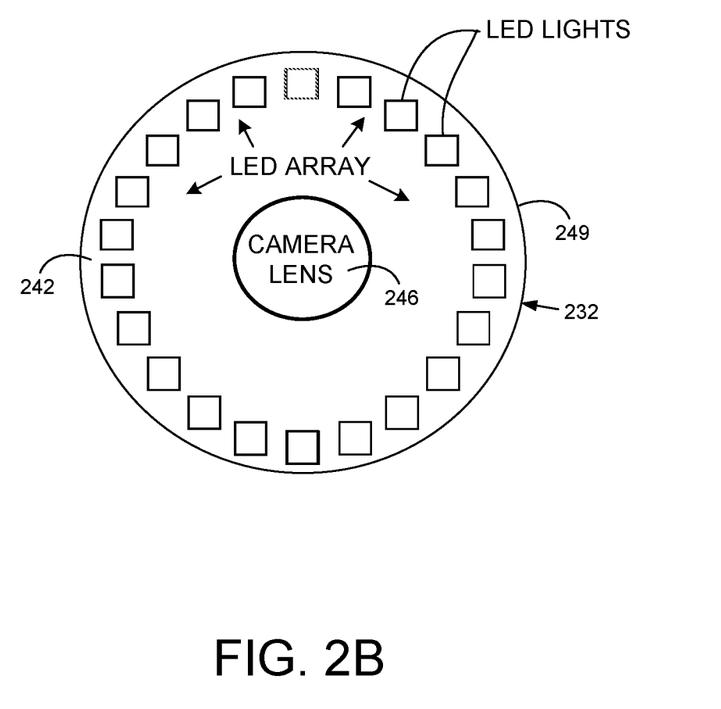
FIG. 2B is a bottom view of the light emitting source of FIG. 2A showing an array of LED lights situated on the light emitting source/sensor PCB and the camera lens centered over the light emitting source/sensor PCB, in accordance with one embodiment of the invention.

FIG. 2B shows a bottom view of light emitting device 200 in FIG. 2A, in accordance with one embodiment of the invention. As shown in FIG. 2B, the array of LED lights is situated along the perimeter of light emitting source/sensor PCB 242 and camera lens 246 is centrally located over light emitting source/sensor PCB 242 and attached to camera 220 (FIG. 2A). Light emitting source cover 244 (not shown in FIG. 2B) is situated over light emitting source/sensor PCB 242 and protects the LED array from damage. Also shown in FIG. 2B, sidewall 249 of enclosure 232 encloses light emitting source/sensor PCB 242.

Figure 3A:
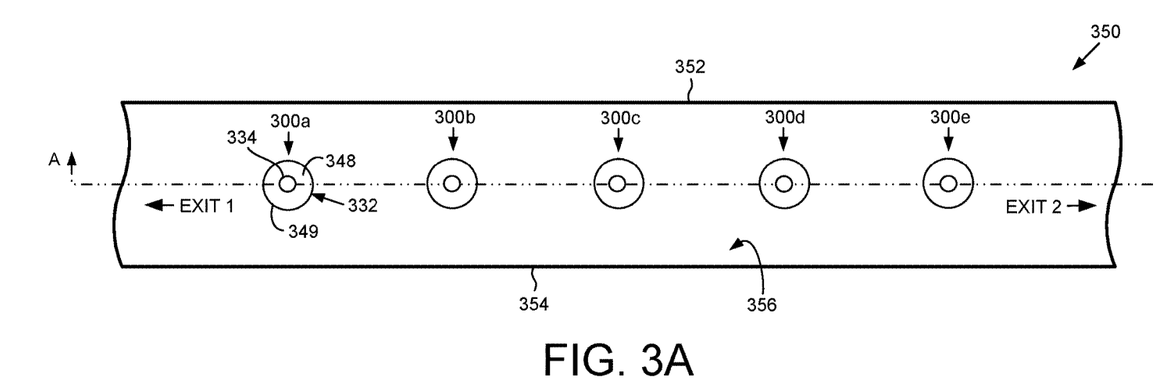
FIG. 3A is a diagram showing a top view of a physical structure (e.g. a hallway, pathway, or covered/partially-covered space in a public, non-commercial, commercial or private structure) including a system comprising a plurality of light emitting devices situated in a ceiling in the physical structure, in accordance with one embodiment of the invention.

FIG. 3A shows a top view of physical structure 350 including a system comprising a plurality of light emitting devices 300a-300e situated in physical structure 350, in accordance with one embodiment of the invention. In the embodiment shown in FIG. 3A, physical structure 350 may be, for example, a pathway, hallway, or covered/partially-covered space in a home, office building, hotel, apartment building, or other public, non-commercial, commercial or private structure. As shown in FIG. 3A, physical structure 350 comprises walls 352 and 354, ceiling 356, and EXITs 1 and 2, which are located at opposing ends of physical structure 350. In the embodiment shown in FIG. 3A, light emitting devices 300a-300e are installed in ceiling 356 of structure 350 and each light emitting device 300a-300e comprises electrical screw base 334, enclosure 332 (which includes end portion 348 and sidewall 349), power supply PCB 236 (FIG. 2A) (which includes power supply 208), emergency power source 238 (FIG. 2A) (e.g., a battery), and processor/memory/communications PCB 240 (FIG. 2A) (which includes processor 212, communication module 214, and NVM 206), and light emitting source/sensor PCB 242 (FIG. 2A) (which includes camera 220 and an array of LED lights). In one embodiment, one or more light emitting devices 300a-300e may not include a sensor (e.g., a camera). While the example of camera 220 is described in conjunction with FIGS. 3A-3D, other sensor(s) may be used, as discussed above.

In the embodiment shown in FIG. 3A, when electrical screw base 334 in each light emitting device 300a-300e is screwed into a corresponding light socket (not shown in FIG. 3A) installed in ceiling 356, and the light socket is electrically connected to an external power source (not shown in FIG. 3A), power may be provided to each light emitting device 300a-300e. In one embodiment, each light emitting device 300a-300e is activated when it receives power from the external power source. In one embodiment, each light emitting device 300a-300e is activated when electrical screw base 334 is screwed into a corresponding light socket installed in ceiling 356 and the light socket is electrically connected to the external power source. In an alternative embodiment, each light emitting device 300a-300e receives power from the external power source when a switch in each light emitting device 300a-300e is set to an ON position after electrical screw base 334 has been screwed into a corresponding light socket installed in ceiling 356 and the light socket has been electrically connected to the external power source.

Figure 3B:
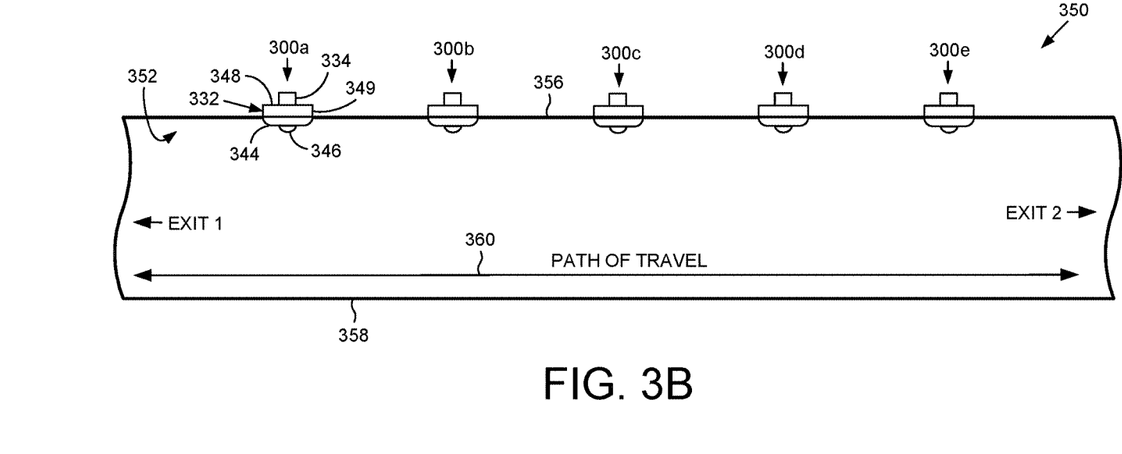
FIG. 3B is a diagram showing a cross-sectional view of the physical structure in FIG. 3A including a path of travel underlying the plurality of light emitting devices, in accordance with one embodiment of the invention.

FIG. 3B shows a cross sectional view of physical structure 350 and light emitting devices 300a-300e along line A-A in FIG. 3A, in accordance with one embodiment of the invention. As shown in FIG. 3B, physical structure 350 further comprises floor 358, over which light emitting devices 300a-300e are located. As shown in the embodiment shown in FIG. 3B, each light emitting devices 300a-300e further comprise light emitting source cover 344 and camera lens 346, which extend below ceiling 356. As shown in FIG. 3B, light emitting devices 300a-300e are also located along a path of travel (indicated by line 360), which extends between exits 1 and 2. In the embodiment shown in FIG. 3B, the path of travel indicates a path that people move along in physical structure 350.

The operation of the system comprising light emitting devices 300a-300e as shown in FIG. 3B will now be discussed prior to detection of a hazard condition (e.g., a fire, broken glass, or spilled liquid that may cause harm to anyone moving along the path of travel) in the path of travel. In the embodiment shown in FIG. 3B, light emitting devices 300a-300e may be activated sequential, in any order. For example, light emitting device 300a may be activated first, any of remaining light emitting devices 300b-300e may be activated second, and so forth. During the discussion of the operation of the system comprising light emitting devices 300a-300e, it is assumed that light emitting device 300a is activated first, light emitting device 300b is activated second, light emitting device 300c is activated third, and so forth. Since light emitting device 300a is activated first, processor 212 (FIG. 2A) in light emitting device 300a is referred to as the "first processor" in the embodiments shown in FIGS. 3B-3D.

In the embodiment shown in FIG. 3B, the first processor is configured to operate in a master mode and processor 212 in each of the remaining light emitting devices 300b-300e is configured to operate in a slave mode after it (i.e., each remaining light emitting device 300b-300e) is activated. In one embodiment, after each of the remaining light emitting devices 300b-300e is activated, the first processor establishes a wireless communication with each of the other processors in the remaining light emitting device 300b-300e and configures each of the other processors to operate in the slave mode. In an embodiment, after each of the remaining light emitting devices 300b-300e is activated, the processor in each of the remaining light emitting devices broadcasts an initiation signal for a predetermined amount of time via its communication module, and the first processor configures it to operate in a slave mode when the first processor receives the initiation signal. In one embodiment, the processor in each of light emitting devices 300a-300e is configured to operate in a master mode or a slave mode based on a setting of a switch in each light emitting device 300a-300e.

In the embodiment shown in FIG. 3B, after light emitting devices 300a-300e are activated, the first processor detects walls 352 and 354 and floor 358 of physical structure 350, detects light emitting devices 300b-300e, and, based at least in part on the detection of walls 352 and 354 and floor 358 and the detection of light emitting devices 300a-300e, determines a location of light emitting device 300a with respect to the path of travel (which underlies light emitting devices 300a-300e). In one embodiment, the first processor may determine the location of each light emitting device 300a-300e with respect to each other light emitting device 300a-300e. In one embodiment, the first processor may determine a location of each light emitting device 300b-300e with respect to light emitting device 300a by causing a light emitting source (e.g., an array of LED lights) in each light emitting device 300b-300e to form a test light pattern after each light emitting device 300b-300e is activated, and using a camera 220 (FIG. 2A) in light emitting device 300a to detect the test light pattern. In the embodiment shown in FIG. 3b, the first processor detects exit 1 via camera 220 (FIG. 2A) in light emitting device 300a, processor 212 in light emitting device 300e detects exit 2 via camera 220 in light emitting device 300e, and processor 212 in light emitting device 300e communicates the location of exit 2 to the first processor.

In the embodiment shown in FIG. 3B, after light emitting devices 300a-300e are activated, the first processor scans for a hazardous condition along the path of travel via camera 220 in light emitting device 300a, and causes processor 212 in each of light emitting devices 300b-300e to scan for the hazardous condition via respective cameras 220 in light emitting devices 300b-300e. In one embodiment, the first processor causes camera 220 in each of light emitting devices 300a-300e to scan for a hazardous condition along the path of travel. In the embodiment shown in FIG. 3B, whenever a hazardous condition has not been detected, the first processor operates in a normal operating mode and causes at least a portion of the array of LED lights in each of light emitting devices 300a-300e to form an illumination pattern emitting light of an illumination color, where the illumination pattern and the illumination color are selected to illuminate the path of travel. For example, the illumination pattern may comprise at least a portion of the LED lights in each light emitting device 300a-330e turned on at a constant intensity, and the illumination color may be white.

Figure 3C:
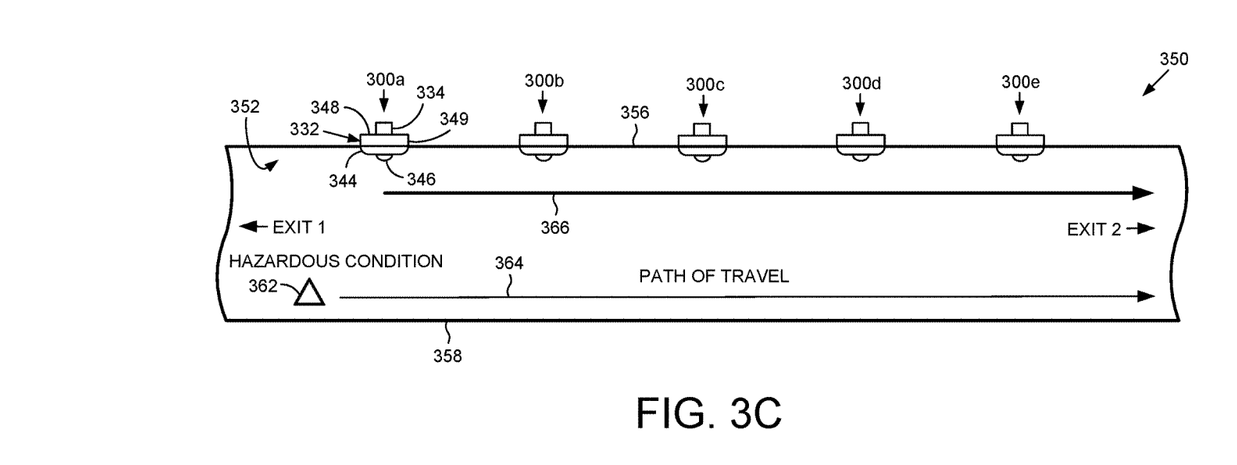
FIG. 3C is a diagram showing a cross-sectional view of the physical structure in FIG. 3A including a path of travel underlying the plurality of light emitting devices and a hazardous condition situated on the path of travel near an exit of the physical structure, in accordance with one embodiment of the invention.

FIG. 3C shows a cross sectional view of physical structure 350 and light emitting devices 300a-300e along line A-A in FIG. 3A, in accordance with one embodiment of the invention. The operation of the system comprising light emitting devices 300a-300e as shown in the embodiment in FIG. 3C will now be discussed when a hazardous condition has been detected along the path of travel (indicated by arrow 364 in FIG. 3C). In the embodiment shown in FIG. 3C, the first processor (i.e., processor 212 in light emitting device 300a) detects hazardous condition 362 near exit 1 along the path of travel. In the embodiment shown in FIG. 3C, after the first processor has detected hazardous condition 362, the first processor causes at least a portion of the array of LED lights in light emitting device 300a to form a warning light pattern emitting light of a warning color. In the embodiment shown in FIG. 3C, since hazardous condition 362 is located near exit 1, the first processor further causes at least a portion of the LED lights in each of light emitting devices 300b-300e to form the warning light pattern emitting light of the warning color, where the warning pattern and the warning color are selected to provide a warning of hazardous condition 362 along the path of travel.

In the embodiment shown in FIG. 3C, the warning light pattern and the warning color are selected to illuminate a direction (indicated by arrow 366), along the path of travel, away from hazardous condition 362. Since detected hazardous condition 362 is located near exit 1, the warning light pattern and the warning color are selected to illuminate a direction (indicated by arrow 366), along the path of travel, toward exit 2. In one embodiment, the warning light pattern and the warning color are selected to illuminate a direction (indicated by arrow 366), along the path of travel, based on detection of exits 1 and 2. In one embodiment, the warning light pattern may comprise a rapid on/off alternation of at least a portion of the LED lights in each of light emitting devices 300a-300e, and the warning color may be red. In the embodiment shown in FIG. 3C, since light emitting device 300a is located close to hazardous condition 362 and each of light emitting devices 300b-300e are progressively farther away from hazardous condition 362, the warning light pattern may comprise at least a portion of the LED lights in each of light emitting devices 300a-300e having an intensity based on proximity to hazardous condition 362, where at least a portion of LED lights in each light emitting device 300a-300b has a lower intensity the farther each light emitting device 300a-300b is from hazardous condition 362.

Figure 3D:
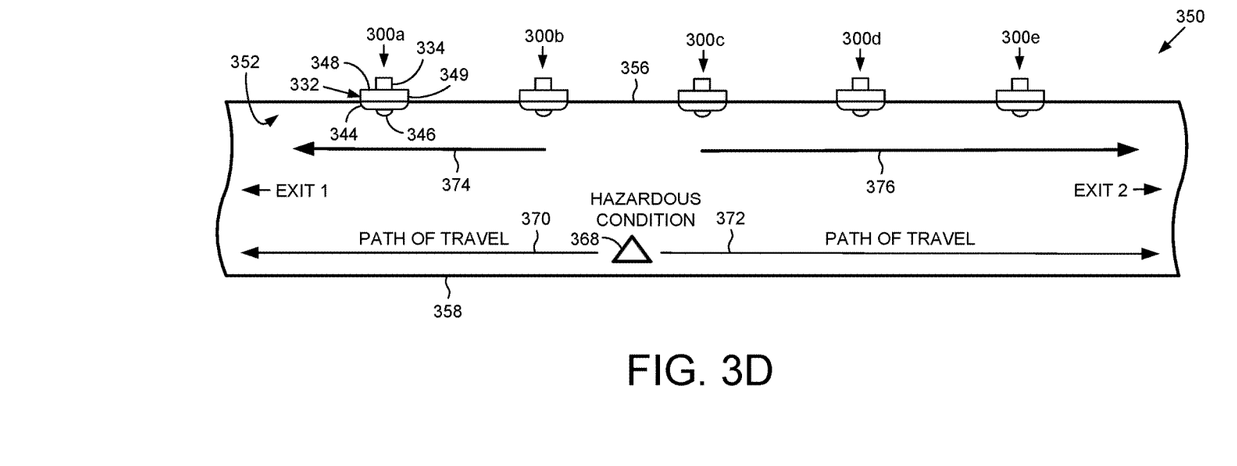
FIG. 3D is a diagram showing a cross-sectional view of the physical structure in FIG. 3A including a path of travel underlying the plurality of light emitting devices and a hazardous condition situated on the path of travel between two of the light emitting devices, in accordance with one embodiment of the invention.

FIG. 3D shows a cross sectional view of physical structure 350 and light emitting devices 300a-300e along line A-A in FIG. 3A, in accordance with one embodiment of the invention. The operation of the system comprising light emitting devices 300a-300e as shown in the embodiment in FIG. 3D will now be discussed when a hazardous condition has been detected between two light emitting devices along the path of travel. In the embodiment shown in FIG. 3D, hazardous condition 368 is detected between light emitting device 300b and 300c along the path of travel, thereby breaking the path of travel that extends between exits 1 and 2 into a path of travel (indicated by arrow 370) that extends from hazardous condition 368 to exit 1 and a path of travel (indicated by arrow 372 that extends from hazardous condition 368 to exit 2. For example, hazardous condition 368 may be detected by processor 212 in light emitting device 300b and/or by processor 212 in light emitting device 300c.

In the embodiment shown in FIG. 3D, when either processor 212 in light emitting device 300b or processor 212 in light emitting device 300c, or both processors in light emitting devices 300b and 300c detect hazardous condition 368 along the path of travel, the detection of hazardous condition 368 is communicated to the first processor (which is operating in the master mode) by whichever processor(s) 212 detected hazardous condition 368. In the embodiment shown in FIG. 3D, when hazardous condition 368 is detected, the first processor causes at least a portion of the LED lights in light emitting devices 300a and 300b to form a first warning light pattern emitting light of a warning color, and causes at least a portion of the LED lights in light emitting devices 300c-300e to form a second warning light pattern emitting light of the warning color, where the first and second warning light patterns and the warning color are selected to provide a warning of hazardous condition 368 along the path of travel.

In one embodiment, in which processor 212 in light emitting device 300b and processor 212 in light emitting device 300c each detect hazardous condition 368, processor 212 in light emitting device 300b causes at least a portion of the LED lights in light emitting devices 300a and 300b to form the first warning light pattern emitting light of the warning color, and processor 212 in light emitting device 300d causes at least a portion of the LED lights in light emitting devices 300c-300e to form the second warning light pattern emitting light of the warning color, where the first and second warning light patterns and the warning color are selected to provide a warning of hazardous condition 368 along the path of travel.

In the embodiment shown in FIG. 3D, the first warning light pattern and the warning light color are selected to illuminate a direction (indicated by arrow 374) along a path of travel (indicated by arrow 370) away from hazardous condition 368 and toward exit 1, and to illuminate a direction (indicated by arrow 376) along a path of travel (indicated by arrow 372) away from hazardous condition 368 and toward exit 2. In the embodiment shown in FIG. 3D, the first and second warning light patterns may each a rapid on/off alternation of at least a portion of the LED lights in each of light emitting devices 300a-300e, and the warning color may be red.

In one embodiment, since hazardous condition 368 is closest to light emitting devices 300b and 300c and farther away from light emitting devices 300a, 300d, and 300e, the first warning light pattern may comprise at least a portion of the LED lights in light emitting device 300b having a greater intensity than at least a portion of LED lights in light emitting device 300a, and the second warning light pattern may comprise at least a portion of the LED lights in light emitting device 300c having a greater intensity than at least a portion of the LED lights in light emitting device 300d, and at least a portion of the LED lights in light emitting device 300d having a greater intensity than at least a portion of the LED lights in light emitting device 300e.

While a simplified and generic hallway configuration is provided in FIGS. 3A-3D to illustrate the various embodiments, other applications and configurations are possible. For example, the light emitting devices need not be mounted on a ceiling. They can be wall mounted, pole mounted, mounted to moveable or fixed objects, or mounted on a combination of various mounting options. In addition, while a single path is illustrated, multiple paths of travel can be possible and a network of light emitting devices may be arranged in a pattern suited for detection of various conditions, providing illumination, etc. and need not be arranged in a single straight line. Finally, installation and use of such devices and systems are not limited to covered spaces within buildings/fixed structures. Applications in open spaces, moveable structures and/or vehicles such as ships, planes, trains, etc. are contemplated in various embodiments.

Figure 4:
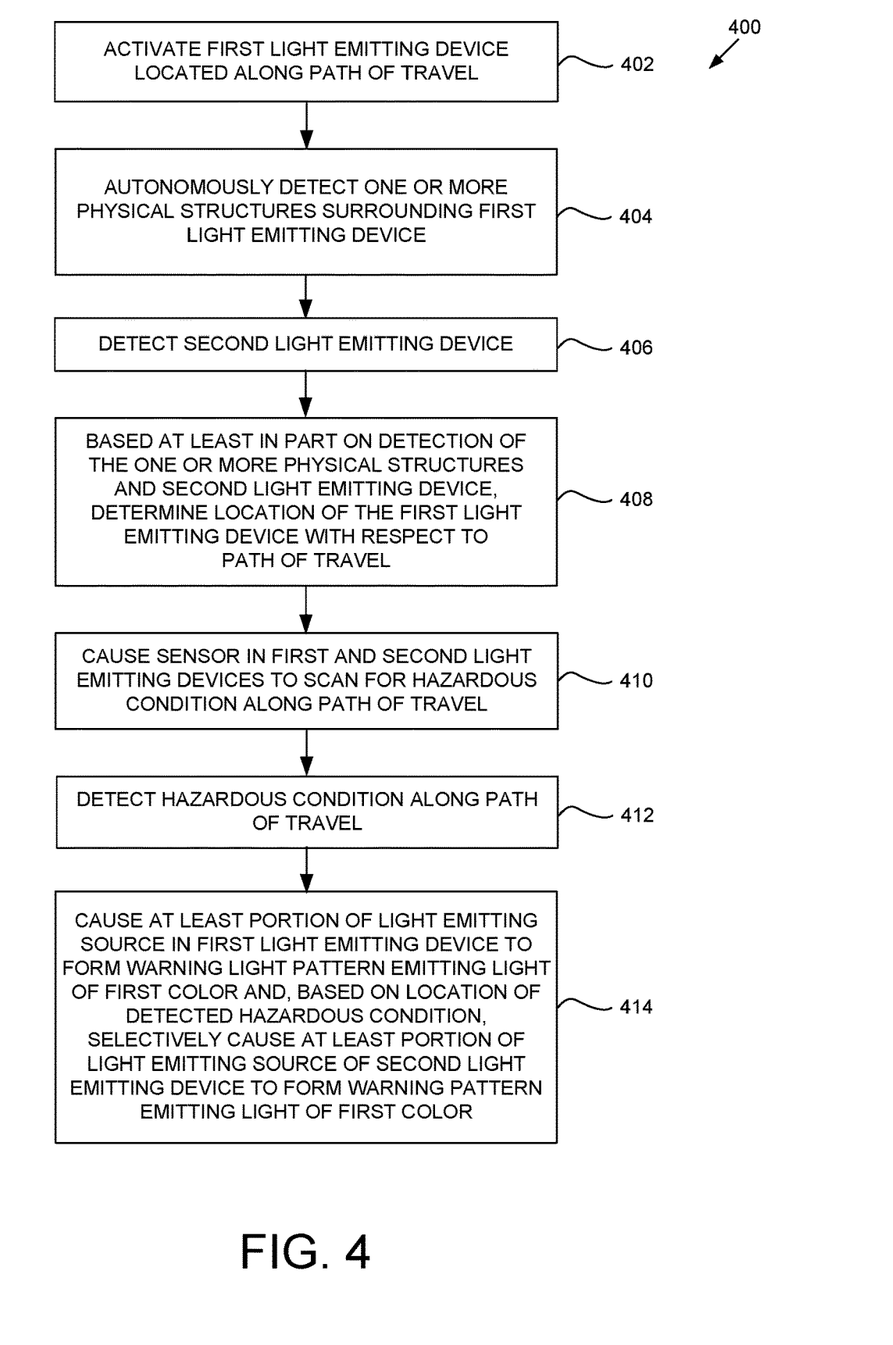
FIG. 4 is a flow diagram showing a process that autonomously detects one or more physical structures surrounding a first light emitting device that was activated along a path of travel, autonomously detect one or more physical structures surrounding the first light emitting device, detect a second light emitting device, based at least in part on detection of the one or more physical structures and the second light emitting device, determine a location of the first light emitting device with respond to the path of travel, in accordance with one embodiment of the invention.

FIG. 4 shows process 400 for operating a system comprising a plurality of light emitting devices situated along a path of travel, in accordance with one embodiment of the invention. Process 400 may be implemented by a processor 212 (FIG. 2) in one of the plurality of light emitting devices (e.g., light emitting devices 300a-330e in FIGS. 3A-3D).

Process 400 starts in block 402, where a first light emitting device (e.g., light emitting device 300a in FIGS. 3A-3D) is activated along a path of travel in the physical structure (e.g., physical structure 350 in FIGS. 3A-3E). For example, light emitting device 300a may be activated by electrically connecting light emitting device 300a to a corresponding socket in ceiling 356 of physical structure 350, where the socket is electrically connected to electrically connected to an external power source (e.g., electrical power source 102 (FIG. 1A)). For example, light emitting device 300a may be by electrically connected to the corresponding socket by screwing electrical screw base 334 (FIGS. 3A-3E) on light emitting device 300a into the corresponding socket.

In block 404, process 400 autonomously detects one or more physical structures surrounding a first light emitting device. For example, the processor in light emitting device 300a (FIGS. 3A-3D) may autonomously detect walls 352 and 354 (FIG. 3A) and floor 358 (FIGS. 3B-3D) of physical structure 350 (FIGS. 3A-3D). In block 406, process 400 detects a second light emitting device (e.g., light emitting device 300b (FIGS. 3A-3D)), and, based at least in part on the detection of the one or more physical structures and the second light emitting device, determines a location of the first light emitting device with respect to the path of travel (block 408). For example, the processor in light emitting device 300a (FIGS. 3A-3D) may detect light emitting device 300b (FIGS. 3A-3D), and, based at least in part on the detection of wall 352 and 354 (FIG. 3A) and floor 358 (FIGS. 3B-3D), determine a location of light emitting device 300a with respect to the path of travel (indicated by line 360) (FIG. 3B).

In block 410, process 400 causes a sensor in the first and second light emitting devices to scan for a hazardous condition along the path of travel. For example, the processor in light emitting device 300a (FIGS. 3A-3D) may cause a camera (or other suitable sensor) in light emitting device 300a and 300b to scan for a hazardous condition along the path of travel (indicated by line 360) (FIG. 3B). In block 412, process 400 detects a hazardous condition along the path of travel. For example, the processor in light emitting device 300a (FIGS. 3A-3D) may detect hazardous condition 362 along the path of travel (indicated by arrow 364) (FIG. 3C). For example, the processor may use a camera (or other suitable sensor) in light emitting device 300a to detect hazardous condition 362. For example, the processor in light emitting device 300b and/or the processor in light emitting device 300c may detect hazardous condition 368 (FIG. 3D) along the path of travel (indicated by arrows 370 and 372) (FIG. 3D).

In block 414, process 400 causes at least a portion of light emitting source in the first light emitting device to form a warning light pattern emitting light of a first color and, based on the location of the detected hazardous condition, selectively cause at least a portion of the light emitting source of the second light emitting device to form the warning light pattern emitting light of the first color. For example, the processor in light emitting device 300a (FIG. 3C) may cause at least a portion of the LED lights in light emitting device 300a to form a warning light of a first color and, based on the location of detected hazardous condition 362 (FIG. 3C), selectively cause at least a portion of the LED lights in the light emitting device 300b to form the warning light pattern of the first color. For example, the warning light pattern and the warning color are selected to provide a warning of hazardous condition 362 along the path of travel.

For example, the warning light pattern may comprise a rapid on/off alternation of at least a portion of the LED lights in each of light emitting devices 300a-300e, and the warning color may be red. For example, the warning light pattern may comprising having at least a portion of the LED lights in each of light emitting devices 300a-300e have a level of intensity based on the distance from hazardous condition 362, where at least a portion of the LED lights in light emitting device 300a (which is closest to hazardous device 362) has a greater intensity than at least a portion of the LED lights in light emitting device 300b (which is farther from hazardous device 362 than light emitting device 300a, and so forth.

It is noted that the blocks (i.e., steps) in the flow diagram in FIG. 4 are shown in a particular order to illustrate an embodiment of the invention. In other embodiments, the blocks in the flow diagram in FIG. 4 may be performed in a different order.

Any suitable processor 112 (FIG. 1A), 212 (FIG. 2A) may be employed in the embodiments of the invention, such as any suitable microprocessor. For example, the processor may be integrated into an SOC in an embodiment of the invention. In one embodiment, the processor comprises a microprocessor executing instructions, the instructions being operable to cause the microprocessor to perform the blocks in the flow diagram described herein. The instructions may be stored in any computer-readable medium. In one embodiment, they may be stored on a non-volatile semiconductor memory external to the processor, or integrated with the processor in an SOC. In another embodiment, suitable logic circuitry, such as state machine circuitry, may be used in place of the processor in each light emitting device.

While some embodiments of the invention have been described, these embodiments have been presented by way of example only, and are not intended to limit the scope of the disclosure. Indeed, the novel methods and devices described herein may be embodied in a variety of other forms. Furthermore, various omissions, substitutions and changes in the form of the methods and devices described herein may be made without departing from the spirit of the disclosure. For example, the various components described may be implemented as software and/or firmware on a processor, ASIC/FPGA, or dedicated hardware. As an additional example, some of the above described power module embodiments may be implemented in electronic devices other than data storage devices.

Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. A system comprising a plurality of light emitting devices located along a path of travel, each light emitting device comprising:
   a light emitting source;
   a sensor;
   a communication module; and
   a processor;
   wherein when a first one of the plurality of light emitting devices is activated, the processor in the first light emitting device is configured to:
      detect one or more physical structures surrounding the first light emitting device;
      detect one or more other light emitting devices;
      based on the detection of the one or more physical structures and the one or more other light emitting devices, determine a location of the first light emitting device with respect to the path of travel;
   wherein when the processor of the first light emitting device detects a hazardous condition, the processor is further configured to:
   cause at least a portion of the light emitting source of the first light emitting device to form a first light pattern emitting light of a first color; and
   based on the location of the detected hazardous condition, selectively cause at least a portion of the light emitting source of the one or more other light emitting devices to form the first light pattern emitting light of the first color; and
   wherein, when a hazardous condition has not been detected, the processor is further configured to cause at least a portion of the light emitting source of the first light emitting device and at least a portion of the light emitting source of the one or more other light emitting devices to form a second light pattern emitting light of a second color.

2. The system as recited in claim 1, wherein the first light pattern and the first color are selected to provide a warning of the detected hazardous condition.

3. The system as recited in claim 1, wherein the first light pattern and the first color are selected to illuminate a direction, along the path of travel, away from the detected hazardous condition.

4. The system as recited in claim 1, wherein the processor is further configured to detect an exit, and wherein the first light pattern and the first color are selected to illuminate a direction, along the path of travel, based on the detected exit.

5. The system as recited in claim 1, wherein the first light pattern comprises a rapid on/off alternation of at least a portion of the light emitting source of the first light emitting device and at least a portion of the light emitting source of the one or more other light emitting devices.

6. The system as recited in claim 1, wherein the second light pattern and the second color are selected to illuminate the path of travel.

7. The system as recited in claim 1, wherein the processor is configured to cause the sensor of the first light emitting device and the sensor of the one or more other light emitting devices to scan for a hazardous condition along the path of travel.

8. The system as recited in claim 1, wherein the processor is configured to use the communication module of the first light emitting device to detect the one or more other light emitting devices.

9. The system as recited in claim 1, wherein each light emitting device is screwed into a standard light socket.

10. A first light emitting device for installation in a pathway comprising a floor and at least one wall, the first light emitting device comprising:
    a first light emitting source;
    a first camera;
    a first wireless communication module; and
    a first processor, when the first light emitting device is activated, configured to autonomously:
       detect the floor and at least one wall of the pathway;
       scan for a second light emitting device;
       based on the detection of the floor and the at least one wall of the pathway, determine a location of the first light emitting device with respect to the pathway;
       wherein when the first processor of the first light emitting device detects a hazardous condition, the first processor is further configured to:
          cause at least a portion of the first light emitting source to form a warning light pattern emitting light of a first color; and based on the location of the detected hazardous condition, selectively cause at least a portion of a second light emitting source of the second light emitting device to form the warning light pattern emitting light of the first color; and wherein, when a hazardous condition has not been detected, the first processor is further configured to cause at least a portion of the first light emitting source of the first light emitting device and at least a portion of the second light emitting source of the second light emitting device to form a second light pattern emitting light of a second color.

11. The first light emitting device as recited in claim 10, wherein the first processor is further configured to:
   detect the second light emitting device after the second light emitting device is activated, the second light emitting device being installed along the pathway and comprising:
      a second wireless communication module; and
      a second processor; and
   wherein the first processor is further configured to establish wireless communication with the second processor.

12. The first light emitting device as recited in claim 11, wherein the first processor is further configured to determine a location of the second light emitting device with respect to the first light emitting device.

13. The first light emitting device as recited in claim 12, wherein the first processor is further configured to determine the location of the second light emitting device with respect to the first light emitting device by:
   causing the second processor to cause the second light emitting source to emit light, and using the first camera to detect the light emitted by the second light emitting source.

14. The first light emitting device as recited in claim 11, wherein the first processor is further configured to use the first camera to detect when a hazardous condition occurs in the pathway.

15. The first light emitting device as recited in claim 11, wherein the second light emitting device further comprises a second camera, and wherein the first processor is further configured to use the first camera and the second camera to detect when a hazardous condition occurs in the pathway.

16. The first light emitting device as recited in claim 14, wherein the first light emitting source comprises a first array of light emitting diode (LED) lights and the second light emitting source comprises a second array of LED lights.

17. The first light emitting device as recited in claim 16, wherein each LED light in the first and second arrays of LED lights is independently controllable to be in an off state, an on state, or a pulsing on and off state and emit light having one of a plurality of colors.

18. The first light emitting device as recited in claim 14, wherein, when the first processor enters a normal operating mode, the first processor is further configured to cause the first light emitting source to emit light to illuminate the pathway.

19. The first light emitting device as recited in claim 16, wherein, when the first processor detects a hazardous condition in the pathway, the first processor is further configured to:
   cause at least a portion of the first array of LED lights to form the warning light pattern emitting light having the first color; and
   cause the second processor to cause at least a portion of the second array of LED lights to form the warning light pattern emitting light having the first color,
   wherein the warning light pattern and the first color are selected to provide a warning of the detected hazardous condition.

20. The first light emitting device as recited in claim 19, wherein the warning light pattern comprises an on/off pulsing pattern of the first color.

21. The first light emitting device as recited in claim 11, wherein the first processor is further configured to operate in a master mode and the second processor is configured to operate in a slave mode.

22. The first light emitting device as recited in claim 11, wherein the first processor is further configured to operate in a master mode and the second processor is further configured to operate in a slave mode during the wireless communication between the first and second processors.

23. The first light emitting device as recited in claim 11, wherein the first processor is further configured to operate in a master mode by setting a first switch in the first light emitting device and the second processor is further configured to operate in a slave mode by setting a second switch in the second light emitting device.

24. A method of operating a system comprising a plurality of light emitting devices located along a path of travel, each light emitting device comprising a light emitting source, a sensor, a communication module, and a processor, the method comprising:
   activating a first one of the plurality of light emitting devices;
   detecting one or more physical structures surrounding the first light emitting device;
   detecting one or more other light emitting devices;
   based on the detection of the one or more physical structures and the one or more other light emitting devices, determining a location of the first light emitting device with respect to the path of travel;
   detecting a hazardous condition;
   causing at least a portion of the light emitting source of the first light emitting device to form a first light pattern emitting light of a first color;
   based on the location of the detected hazardous condition, selectively causing at least a portion of the light emitting source of the one or more other light emitting devices to form the first light pattern emitting light of the first color; and
   when a hazardous condition has not been detected, causing at least a portion of the light emitting source of the first light emitting device and at least a portion of the light emitting source of the one or more other light emitting devices to form a second pattern emitting light of a second color.

25. The method as recited in claim 24, wherein the first light pattern and the first color are selected to provide a warning of the detected hazardous condition.

26. The method as recited in claim 24, wherein the first light pattern and the first color are selected to illuminate a direction, along the path of travel, away from the detected hazardous condition.

27. The system as recited in claim 1, wherein the processor is further configured to detect the one or more physical structures surrounding the first light emitting device using the sensor.

28. The first light emitting device as recited in claim 10, wherein the first processor is further configured to detect the floor and at least one wall of the pathway using the first camera.

29. The method as recited in claim 24, further comprising detecting the one or more physical structures surrounding the first light emitting device using the sensor of the first light emitting device.

* * * * *